United States Patent [19]

Porta et al.

[11] 4,276,134
[45] Jun. 30, 1981

[54] METHOD FOR REMOVING CHLORATE FROM CAUSTIC SOLUTIONS WITH ELECTROLYTIC IRON

[75] Inventors: Augusto Porta, Geneva; Jacques Mosetti, Grand Lancy, both of Switzerland

[73] Assignee: The Dow Chemical Company, Midland, Mich.

[21] Appl. No.: 172,923

[22] Filed: Jul. 28, 1980

[51] Int. Cl.³ .............................................. C25C 1/06
[52] U.S. Cl. ...................................... 204/153; 204/112
[58] Field of Search ................ 423/184; 204/153, 112, 204/98

[56] References Cited

U.S. PATENT DOCUMENTS

| | | | |
|---|---|---|---|
| 2,270,376 | 1/1942 | Ladd | 204/153 |
| 2,403,789 | 7/1946 | Cummins | 423/184 |
| 2,404,453 | 7/1946 | Osborne et al. | 204/153 |
| 3,244,605 | 4/1966 | Hotchkiss et al. | 204/153 |
| 3,784,456 | 1/1974 | Otto | 204/153 |

Primary Examiner—R. L. Andrews

[57] ABSTRACT

A process for removing chlorate from a caustic solution by the reduction of the chlorate with metallic iron. The process is particularly distinguished by the steps of contacting the caustic solution with iron to reduce the chlorate to chloride, contacting the caustic solution containing dissolved iron therein with a conductive substrate to electrolytically precipitate the iron on the substrate, thus providing a caustic solution which is substantially free from iron and chlorate ions, separating the purified portion of the caustic solution, and periodically using the iron coated substrate for treating an untreated portion of the caustic solution to reduce the chlorate to chloride, and periodically reusing the iron depleted substrate, for recovering dissolved iron from the caustic solution. The process of this invention decreases the chlorate content of caustic solutions to an acceptable level of a few ppm and also recovers dissolved iron on an iron depleted substrate for reuse and further reduction of chlorate of an untreated portion of the caustic solution.

8 Claims, 1 Drawing Figure

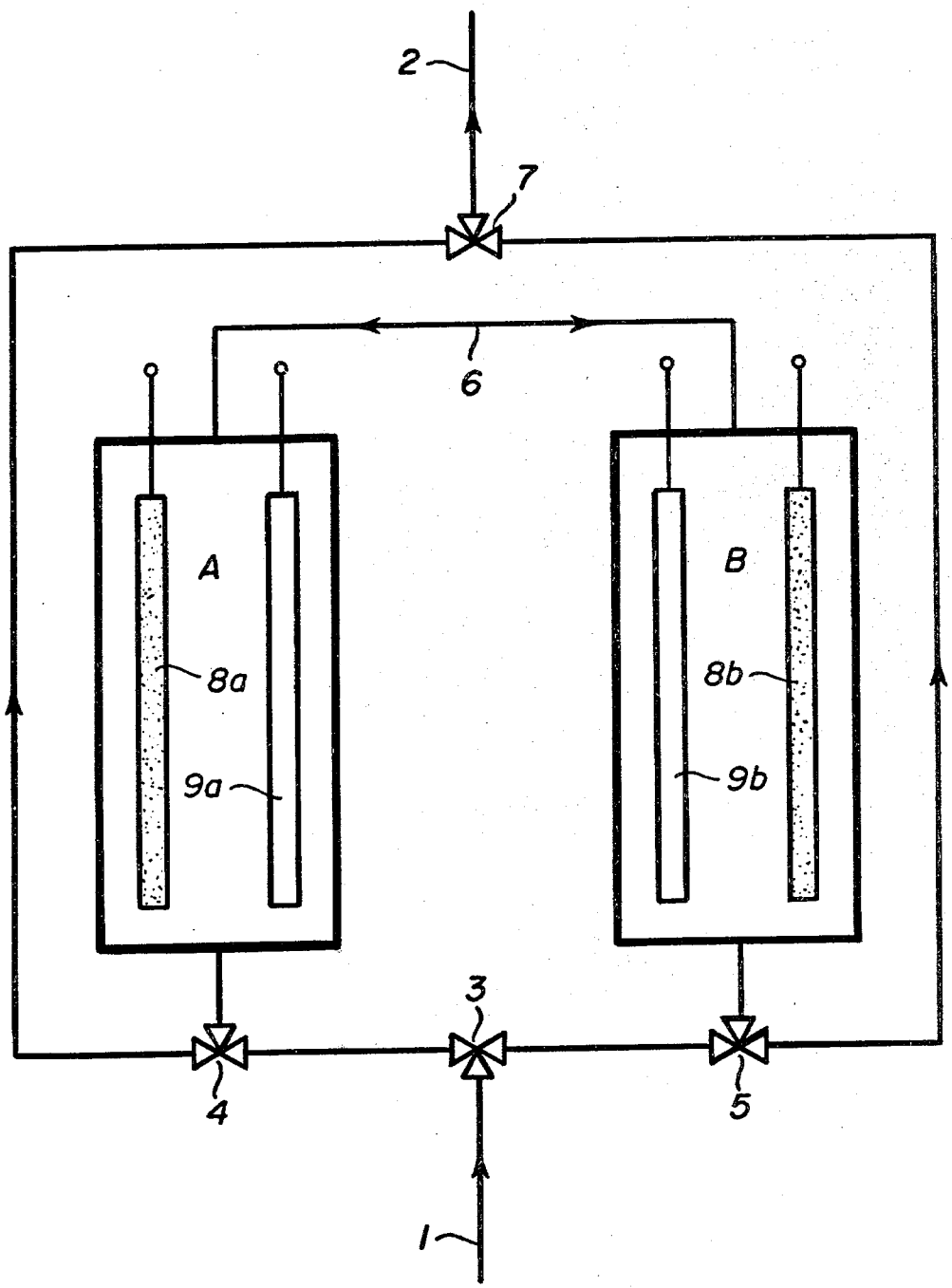

METHOD FOR REMOVING CHLORATE FROM CAUSTIC SOLUTIONS WITH ELECTROLYTIC IRON

BACKGROUND OF THE INVENTION

The present invention resides in the removal of chlorate from caustic solutions with iron and the consecutive recovery of said iron in metal form.

The removal of unwanted excess chlorate in sodium hydroxide solutions obtained from the diaphragm electrolysis of brine is carried out by using reducing agents, a number of which have been described, including iron. Thus, U.S. Pat. No. 2,404,453 discloses the reduction of chlorate in sodium hydroxide solutions containing about 50 percent NaOH using iron in comminuted form (chips or turnings), said iron particles being coupled with a more noble metal such as copper. Also, U.S. Pat. No. 2,403,789 discloses the purifying of 30-60 percent NaOH solution from excess chlorate by means of iron powder or filings. In such processes, the iron dissolves in the caustic forming $Fe^{+2}$ and $Fe^{3+}$ ions and simultaneously reducing the chlorate to chloride.

The dissolved iron which is then present as an impurity in the caustic solution as the result of the removal of chlorate should thereafter be eliminated by means involving, for example, oxidation, precipitation or electrolytic reduction. Thus, the cathodic removal of iron and other metal ions has been disclosed in the following publications: U.S. Pat. No. 3,244,605 and French Pat. No. 1,505,466. According to the prior art, the caustic solution containing the iron to be removed (and possibly other metal impurities) is subjected to electrolysis whereby the iron deposits as a metallic coating on the cathode of the electrolytic cell. However, it has not been reported that such electrolytically deposited iron can be re-used for again reducing the chlorate content of a yet untreated caustic solution.

SUMMARY OF THE INVENTION

It is an object of the present invention to use electrolytically reduced iron for removing chlorate from caustic solutions obtained by the diaphragm process.

A further object of the invention is to decrease the chlorate content of caustic solutions containing from 300 to 1000 ppm $ClO_3^-$ down to acceptable levels of a few ppm.

Another object of the invention is to provide economical and practical means for achieving the above task using iron as the reducing material.

Another object of the invention is to remove the iron impurity from caustic solutions in which it is present as the result of the removal of $ClO_3^-$.

Still another object of the invention is to recover the dissolved iron having been used for the reduction of the chlorate by cathodic reduction into its elemental form and to re-use said recovered iron for further reducing the chlorate of a still untreated portion of the caustic solution, this operation being very economical since overall consumption of iron is then strongly minimized.

Said objects which will become apparent hereinbelow are achieved by the process for removing unwanted chlorate from caustic solutions by the reduction of said chlorate with metallic iron which comprises using electrodeposited iron as the reducing agent.

The invention also resides in a process for removing unwanted chlorate from a caustic solution by dissolution therein of metallic iron and simultaneous reduction of said chlorate by said iron and consecutively electrolytically removing said iron from the chlorate free solution which comprises (A) contacting said solution of caustic to be purified with the iron metal in a form appropriate for its easy dissolving in the solution and consequent reducing of the $ClO_3^-$ to chloride, then (B) contacting the resulting solution containing dissolved iron with at least one conductive substrate, the latter being suitably adapted and polarized for electrolytically precipitating the iron in a form suitable for subsequently reducing chlorate as under (A) above, thus causing said iron to deposit thereon in pulverulent metallic form, thus providing a solution substantially free from iron and $ClO_3^-$ ions, (C) separating said purified portion of the solution and (D) periodically using said substrates when sufficiently coated with said metallic iron to treat a yet untreated portion of the caustic solution as under (A) above and periodically, after consumption of said available deposited iron, re-using said substrates for recovering said dissolved iron as under (B) above.

DETAILED DESCRIPTION OF THE PREFERRED EMBODIMENTS

The conditions required for carrying out the process of the invention are not critical. However, preferably step (A) is carried out at temperature above room temperature, preferably at about 100° C., with or without agitation. The contacting time depends on the temperature and can be conducted over a period of time from 1 to 20 hours, this time also depending on the ratio of available iron to the caustic to be treated. Such ratio is also not critical provided, naturally, that the available iron be at least stoichiometrically sufficient for reducing the chlorate to be removed. In practice, it has been found that when nearly 100 percent of the original chlorate has disappeared, that is when there remains from 5 to 15 ppm of $ClO_3^-$, the amount of dissolved iron is from 400 to 600 ppm. Therefore, the amount of iron to be used is somewhat dependent on the total amount of chlorate originally present in the caustic solution to be purified. However, in practice it is always advantageous to use a large excess of metal iron since its physical bulk relative to the solution is not a problem and, actually, no more than the quantity required for effecting the required reduction needs to be dissolved. Therefore, the amount of iron to be used, and its physical arrangement within the solution will be easily determined by the skilled practitioner, this being also dependent on whether the practical implementation relates to a batch or a continuous process.

The parameters for carrying out step (B) of the above described process are also not critical. It is indeed very fortunate that the electrodeposition of iron under that strongly alkaline conditions prevailing within concentrated caustic solutions will provide that form of metallic iron which is suitable for reducing the chlorate. Thus, not depending on the nature of the conductive substrate used as the cathode, the iron will deposit in porous spongy form particularly suited for being easily re-dissolved because its "sintered" or agglomerated structure allows a very large surface of metal to be contacted by the solution. Practically, electrodes of porous graphite or metal mesh, e.g. iron or nickel are suitable. Current densities of from 0.1 to 10 A/dm²

(amperes per decimeter$^2$) and temperatures of from room temperature to 80° C. are suitable for recovering the iron according to step (B) above in a form adequate for being re-used according to step (A). Preferably, the solution is agitated or circulated during said recovery. The counter electrodes (anodes) must naturally not dissolve in the caustic solution by oxidation and are preferably made of noble metals or anodes having a substrate coated with a noble metal or a noble metal oxide such as, for example, a titanium core coated with a noble metal oxide. In practice, platinized expanded titanium is suitable. It should be remarked that, even in cases where electrolytic recovery conditions of the iron are such that they provide homogeneous, inherently non-porous deposits, the porous nature of the cathodically polarized substrates will ensure that a sufficient amount of internal discontinuities exist within the coated layer for still having the iron in highly divided form.

There are, of course, many possible embodiments for physically implementing the invention. For instance, in a first embodiment, the solution to be treated is introduced in a conventional glass or polytetrafluoroethylene (PTFE) laboratory container and contacted at a moderately elevated temperature of from 80° to 100° C. with a plate of nickel mesh covered by electrolytically plated iron in pulverulent form. The solution is periodically analyzed by conventional means for chlorate and iron and when the initial chlorate of from 400–500 ppm has been decreased by 90 to 95 percent, the temperature is lowered to about 50° C. and an anode plate is immersed into the liquid and electrolysis is carried out against the iron clad plate until practically all iron has been plated out and redeposited thereon. Conditions for achieving this are those described in technical literature, namely for instance the references mentioned hereintofore. Then, when the iron content has been reduced to nearly zero (practically a few ppm) the electrolysis is stopped and the purified solution is poured out and replaced by a new portion of untreated caustic. The temperature is raised again and the whole process is repeated thus avoiding undue losses of iron. It has been found that during the iron recovery step, other heavy metals which may be present in the solution, e.g. Ni, Co, Mn, Pb, are also plated out which constitutes a further advantage of the invention. During the dissolution stage, some of these metals will stay inert and, as a consequence, the substrate will get progressively enriched in such plated metals other than iron in the course of repetition of the successive dissolution and plating cycles. Therefore, there will come a time when the substrate is over-enriched and the plate will have to be taken out and replaced. However, this is not a dead-loss since such metals other than iron can then be recovered from the plate.

The annexed FIGURE is a schematic representation of an exemplary system for continuously purifying caustic solution from unwanted chlorate using iron in a closed cycle.

The system comprises an inlet conduit 1 for the unpurified caustic and a general outlet conduit 2 for the purified solution. The impure caustic solution can be directed at will from conduit 1 through a two-way valve 3 to a first cell A or to a second cell B, the inlet conduits to these cells being controlled by two-way valves 4 and 5. Therefore, the solution can also flow at will from cell A to cell B, or vice-versa, through conduit 6. Whichever way, the solution, after flowing through cells A and B will leave through one of the valves 4 or 5, the latter having been properly adjusted for the desired purpose, and will finally flow out of the general outlet conduit 2 after having passed through a two-way control valve 7. It is easily seen that, in order to properly provide the desired flow direction throughout, the various valves must be linked together by conventional means not represented here for the sake of simplicity but which will operate so as to simultaneously actuate the various valves in order to either direct the caustic solution from the inlet conduit to cell A, to cell B, and to the outlet conduit or from the inlet conduit to cell B, to cell A and to the outlet conduit.

Each of the cells contains one plate covered with electrolytically reduced iron, respectively 8a and 8b, and a plate, respectively 9a and 9b, made of an electrochemically inert material, e.g. platinized titanium or titanium covered with a noble metal oxide, these plates being connectable at will to a suitable DC generator not represented here.

Under operating conditions, the present system will function as follows: In a first mode, the valves will be adjusted so that the path of the caustic solution is directed from cell A to cell B; the plates of cell A will stay unpolarized whereas plate 8b of cell B will be made negative to plate 9b by means of the above-mentioned generator. Thus, the caustic solution flowing along plate 8a of cell A will become purified from excess chlorate by contacting the iron deposited on said plate but will simultaneously be loaded with iron. Then the iron containing caustic solution will flow through cell B whereby the iron will deposit electrolytically on plate 8b. After some time, the iron supply on plate 8a will be depleted and plate 8b will be fully plated; then, in a second mode, the valves will be re-adjusted to provide the solution flow from cell B to cell A, the b plates will be disconnected and the a plates will be polarized as described above in the case of the first mode for the b plates. The whole process is then allowed to continue, the only operation being to periodically switch back from the second to the first mode and vice-versa.

Of course, the process can be operated semi-continuously, the valves being fully closed and operation being carried out on a finite portion of the caustic, then opened to allow the content of one cell to flow to the other cell while re-filling the one cell with an untreated solution and emptying the other cell from the purified portion, such sequence being repeated until exhaustion of the iron on the reducing plate of the one cell. Then, the series of sequences will be continued after reversing the order of the cells as described above for the fully continuous embodiment.

In the present embodiment, the materials used for making the conduits, the valves and the cells can be any resins inert to concentrated caustic solutions and resisting moderately elevated temperatures. As such, polyolefins, melamine-formaldehyde and polytetrafluoroethylene (PTFE) can be contemplated. Otherwise, metals such as monel, stainless steel or bronze can also be used.

The invention is further illustrated in more detail by the following examples.

EXAMPLE 1

First phase

A 20 cm$^2$ sintered iron electrode plate, prepared by manually depositing a 4 mm layer of iron powder (50-80 μm particles) on a 0.5 mm ironplate, then sintering 1 hour at 900° C. under nitrogen plus 5 percent $H_2$, was introduced into a 400 ml PTFE cylindrical container provided with agitation and reflux condenser. 250ml of a 35 percent sodium hydroxide containing 445 ppm chlorate was introduced into the container and heated to 110° C. The reaction was allowed to proceed under moderate agitation, samples of the solution being removed at intervals for analysis. Table I, below, shows the results of said analysis performed by known methods described hereinafter. Such results indicate that most of the $ClO_3^-$ was removed after about 6 hours reaction time.

TABLE I

| Time, hrs | $ClO_3^-$, ppm | Fe, ppm | $ClO_3^-$, removal, % |
|---|---|---|---|
| 0 | 445 | 0 | 0 |
| ½ | 445 | 3.5 | 0 |
| 1 | 410 | 32 | 8 |
| 1½ | 374 | 57 | 16 |
| 2¼ | 240 | 139 | 46 |
| 3 | 160 | 238 | 64 |
| 4 | 72 | 480 | 85 |
| 6 | 18 | 530 | 96 |

Second phase

Thereafter, a 20 cm$^2$ platinized anode was introduced into the container and adjusted parallel to the iron plate at about 5 cm thereof. Then the solution was electrolyzed at 80° C. under 4 A/cm$^2$ for a day after which the iron level was found to be 12 ppm (about 98 percent removal).

The container was refilled with chlorate contaminated caustic and the process was repeated with essentially the same results. The whole cycle including phase one followed by phase two was repeated several times with no significant change in behavior of the reducing aand recovery conditions.

The analytical methods used were the following:
Chlorates

An amount of solution corresponding to approximately 60 mg of $NaClO_3$ was measured exactly and introduced into a 10 ml volumetric flask, then 3 ml of concentrated $H_2SO_4$ (98%) were carefully introduced from a 3 ml safety pipette by making the tip of the pipette touch the inside wall of the upper stem of the flask and releasing the acid slowly. The solution was cooled to room temperature, 0.020 grams of $FeSO_4(NH_4)_2SO_4.6H_2O$ (MOHR's salt), were added, the solution was levelled to the mark with distilled water and mixed thoroughly. A reagent blank was prepared in the same manner. Then, the absorbances (vs $H_2O$) of the reagent blank and the sample solution were measured at 301 mμ in a 1 cm silica cell. The reagent blank was stable for at lest one hour and its absorption only accounted to about 0.060 of an absorbance unit. The chlorate content was calculated from:

$$E^{310}_{Fe^{+3}, 10, 9NH_2SO_4} = 2.90 \times 10^3 \text{ liter mole}^{-1}\text{cm}^{-1}$$

Iron 10 ml of the sample, 10 ml of concentrated hydrochloric acid, 1 ml of hydrogen peroxide and 10 ml of ammonium thiocyanate were introduced into a 100 ml volumetric flask. After dilution to volume, a spectrophometric measurement was performed at 470 mμ. As this method is very sensitive (works in the range of 1 to 10 mg/l), it was necessary to choose an adequate volume of sample in the measurable concentration range.

EXAMPLE 2

A 25 cm$^2$ nickel grid plate, 40 mesh, (pore openings $\approx$ 500 μm) was immersed for several minutes in 2 N HCl, then rinsed in distilled water. Then it was used to de-ironize at 50° C., 600 ml of 50 percent sodium hydroxide under 4 A/dm$^2$. The electrolysis was carried out for 2¼ days, after which the iron removal was 99 percent.

Then the iron plated nickel grid was used to reduce the chlorate content of 200 ml of a 50 percent untreated caustic solution containing 500 ppm of $ClO_3^-$ for 5 hours at 100° C. exactly as described in phase 1 of Example 1. After that period, the chlorate was 99 percent removed and the iron content was 650 ppm. Then the iron was removed as described in phase 2 of Example 1 and the whole cycle was repeated several times with no significant change in the behavior of the plates and the reagents.

EXAMPLE 3

A sintered iron plate similar to that used in Example 1 was used as described in said Example for treating chlorated (550 ppm) 50 percent sodium hydroxide solution. Every twelve hours, the cell was emtied, the dechlorated solution was put aside and a fresh portion of chlorated solution was put to work for a new 12 hours period without changing the iron plate. After a total of 5 lit. of caustic had been treated, the iron was about fully consumed and the plate became inoperative.

Then, the iron contaminated de-chlorated solution was poured into a 10 lit. PTFE tank and subjected to electrolysis at 50° C. using a platinized titanium anode and the above iron stripped plate as the cathode. During electrolysis, the solution was kept under moderate agitation. After about 80 percent of the iron was plated out, the iron clad cathode was removed and re-used to dechlorate untreated portions of caustic with subsequent removal of iron as described in Example 1. This plate provided the same service as the plate of Example 1.

EXAMPLE 4

A stainless steel tank was filled with 2.5 lit. of a 45 percent NaOH solution containing 375 ppm of chlorate and reduction was carried out at 100° C. under slight agitation with a 125 cm$^2$ sintered iron plate. The results are shown in Table II below.

TABLE II

| Time, hrs | $ClO_3^-$, % removal | Fe, ppm |
|---|---|---|
| 0 | 0 | 0 |
| 2 | 16 | 74 |
| 3 | 33 | 172 |
| 4 | 49 | 298 |
| 5 | 62 | 314 |
| 15 | 98 | 450 |

Then the solution was put into a 5 liter cylindrical PTFE cell and electrolyzed under agitation with a 58.6 cm$^2$ vitreous carbon cathode and a 50 cm$^2$ platinized expanded titanium anode. The current density was about 2 A/dm$^2$ and temperature 110° C. The results are shown in Table III.

TABLE III

| Time, hrs | Fe, ppm | Iron recovered, % |
|---|---|---|
| 0 | 450 | 0 |
| 1¼ | 154 | 66 |
| 2¾ | 23 | 95 |
| 4⅜ | 18 | 96 |
| 6 | 5 | 99 |

The process of iron recovery was repeated four times using fresh iron containing solutions but still using the same plate as the cathode. Thereafter such iron clad plate was used in a series of chlorate purification and iron removal cycles as described in the previous Examples with equally good results.

EXAMPLE 5

The set up of Example 1 was used but with the difference that during phase 1 ($ClO_3^-$ removal) an iron sheet electrode was immersed in the cell, and a DC generator was connected to that electrode (cathode) and to the sintered iron plate (anode).

Then, the reduction of chlorate was carried out in the same conditions as for Example 1, but with the addition of a small current between the sintered iron anode (0.1 A/dm$^2$) and the other electrode in order to speed up iron dissolution. The results are shown in Table IV and indicate that the removal of chlorate is somewhat accelerated compared to operating without current.

TABLE IV

| Time, hrs | $ClO_3^-$, ppm | $ClO_3^-$, % removal | Fe, ppm |
|---|---|---|---|
| 0 | 400 | 11 | 86 |
| ½ | 325 | 27 | 161 |
| 1 | 277 | 38 | 234 |
| 1½ | 210 | 53 | 189 |
| 2 | 165 | 63 | 167 |
| 2½ | 108 | 76 | 234 |
| 4 | not measurable | ~100 | 500 |

Thereafter the sintered iron electrode was used to perform iron recovery as described in Example 1. The above two-phase cycle could be repeated several time with no significant changes to the results obtained.

What is claimed is:

1. A process for removing unwanted chlorate from caustic solutions by the reduction of said chlorate with metallic iron which comprises using electrodeposited iron as the reducing agent.

2. The process of claim 1, wherein said iron is electrodeposited from a chlorate free iron containing caustic solution.

3. The process of claim 1, wherein the caustic solution is being obtained from brine by the electrolytic diaphragm method.

4. A process for removing unwanted chlorate from a caustic solution by dissolution therein of metallic iron and simultaneous reduction of said chlorate by said iron and consecutively electrolytically removing said iron from the chlorate free solution which comprises (A) contacting said solution of caustic to be purified with the iron metal in a form appropriate for its easy dissolving in the solution and consequent reducing of the $ClO_3^-$ to chloride, then (B) contacting the resulting solution containing dissolved iron with at least one conductive substrate, the latter being suitably adapted and polarized for electrolytically precipitating the iron in a form suitable for subsequently reducing chlorate as under (A) above, thus causing said iron to deposit thereon in pulverulent metallic form, thus providing a solution substantially free from iron and $ClO_3^-$ ions, (C) separating said purified portion of the solution and (D) periodically using said substrates when sufficiently coated with said metallic iron to treat a yet untreated portion of the caustic solution as under (A) above and periodically, after consumption of said available deposited iron, re-using said substrates for recovering said dissolved iron as under (B) above.

5. The process of claim 4 which comprises introducing a first portion of caustic solution to be purified in a first cell containing a first plate covered with pulverulent iron and second plate inert to the caustic solution and allowing the pulverulent iron to dissolve thus effecting the reduction of the chlorate impurity, then removing the iron loaded solution from the first cell and introducing it into a second cell provided with a third and fourth conductive plates, the fourth one being again inert toward the caustic solution, establishing a voltage between the third and fourth plate for negatively polarizing the third plate, producing a current and causing the dissolved iron to electrolytically deposit thereon, then removing the $ClO_3^-$ and iron free solution and repeating the cycle with yet untreated portions of the solution until practically all iron of the first plate has been transferred to the third plate.

6. The process of claim 5, wherein the sequential order of the cells is reversed, $ClO_3^-$ removal taking place in the second cell by contact with the third plate and so on, this change occurring when the first plate is depleted from its iron supply the latter being plated out on the third plate.

7. The process of claim 4, wherein step (A) is carried out at a temperature of from 80° to 110° C. and step (B) at a temperature of from 50° to 80° C. at a current density of from 0.1 to 10 A/dm$^2$.

8. The process of claim 4, wherein the iron dissolution in step (A) is accelerated by polarizing positively the iron to be dissolved relative to another electrode immersed in the solution, said acceleration being due to anodic dissolution.

* * * * *